(12) United States Patent
Stephens, Jr.

(10) Patent No.: US 9,075,830 B2
(45) Date of Patent: Jul. 7, 2015

(54) PROPAGATION THROUGH PERDURANCE

(75) Inventor: James H. Stephens, Jr., Austin, TX (US)

(73) Assignee: Morphism LLC, Austin, TX (US)

( * ) Notice: Subject to any disclaimer, the term of this patent is extended or adjusted under 35 U.S.C. 154(b) by 431 days.

(21) Appl. No.: 13/429,168

(22) Filed: Mar. 23, 2012

(65) Prior Publication Data

US 2012/0246182 A1    Sep. 27, 2012

Related U.S. Application Data

(60) Provisional application No. 61/467,081, filed on Mar. 24, 2011.

(51) Int. Cl.
*G06F 17/30* (2006.01)
(52) U.S. Cl.
CPC .............................. *G06F 17/30286* (2013.01)
(58) Field of Classification Search
None
See application file for complete search history.

(56) References Cited

U.S. PATENT DOCUMENTS

| 4,658,370 | A  | * | 4/1987 | Erman et al. ................... 706/60 |
| 7,287,018 | B2 |   | 10/2007 | Lennon |
| 7,328,209 | B2 |   | 2/2008 | Das et al. |
| 7,433,876 | B2 |   | 10/2008 | Spivack et al. |
| 7,502,770 | B2 |   | 3/2009 | Hillis et al. |
| 7,516,155 | B2 |   | 4/2009 | Ivan et al. |
| 7,860,838 | B2 | * | 12/2010 | Gupta et al. .................. 707/651 |
| 8,135,730 | B2 |   | 3/2012 | Lim et al. |
| 8,140,535 | B2 |   | 3/2012 | Eggebraaten et al. |
| 8,244,664 | B2 | * | 8/2012 | Ghosh et al. ..................... 706/54 |
| 2003/0191679 | A1 | * | 10/2003 | Casati et al. ...................... 705/8 |
| 2003/0225761 | A1 | * | 12/2003 | Wagener et al. .................. 707/6 |
| 2006/0101089 | A1 | * | 5/2006 | Parr et al. ....................... 707/200 |
| 2007/0005410 | A1 | * | 1/2007 | Kasravi et al. .................... 705/8 |
| 2008/0034083 | A1 | * | 2/2008 | Koran ............................. 709/224 |
| 2008/0155564 | A1 | * | 6/2008 | Shcherbina et al. .......... 719/318 |
| 2008/0301240 | A1 | * | 12/2008 | Svendsen ...................... 709/206 |
| 2008/0306908 | A1 | * | 12/2008 | Agrawal et al. .................. 707/3 |
| 2009/0019456 | A1 | * | 1/2009 | Saxena et al. ................. 719/318 |
| 2011/0283045 | A1 | * | 11/2011 | Krishnan et al. .............. 711/102 |
| 2012/0198282 | A1 | * | 8/2012 | Carter et al. .................... 714/39 |

OTHER PUBLICATIONS

Pasca "Acquisition of Categorized Named Entities for Web Search", Google Inc., CIKM, ACM, Nov. 8-13, 2004, pp. 137-145.*

* cited by examiner

*Primary Examiner* — Polina Peach
(74) *Attorney, Agent, or Firm* — Terrile, Cannatti, Chambers & Holland, LLP

(57) ABSTRACT

An event processor accepts event representations that comprise perdurance and epistemological relationships among entities or entity references, and the event processor stores information derived from event representations in a datastore. A search component searches entities based on local epistemological and perdurance properties, and a perdurance engine traverses the perdurance relationships obtained from the datastore. An epistemological propagator generates derived epistemological relationships using the perdurance engine and local epistemological data obtained from the datastore.

8 Claims, 2 Drawing Sheets

PROPAGATION THROUGH PERDURANCE

CROSS REFERENCE TO RELATED APPLICATION

This application claims priority to U.S. Provisional Patent Application No. 61/467,081, filed Mar. 24, 2011, and entitled "Identity Server", the entire disclosure of which is incorporated herein by reference.

BACKGROUND OF THE INVENTION

1. Field of the Invention

The present invention relates in general to the field of processing information and more specifically to knowledge representation for changing entities.

2. Description of the Related Art

According to Plutarch in his *Life of Theseus*, the mythical founder-king Theseus of Athens returned from Crete on ship that had each plank replaced during the voyage. Plutarch wondered if the ship that set sail from Crete was the same ship that arrived at Athens. In a similar vein, Plato in *Cratylus* quotes Heraclitus as observing that one cannot step in the same river twice because waters continue to flowing in. Socrates himself has related concerns with characterizing or naming things that change. "I think we should abandon names of this kind: our greatest probability of finding correctly assigned names in connection with those things that have a permanent being and nature." However, some things that do not have a "permanent being and nature" often still require names and other properties.

Though a formidable philosophical literature on these topics exists, the issues are not only academic. For example, what happened to Dade County, Florida? It was there on Nov. 12, 1997, with FIPS code 25. On Nov. 13, 1997, "Dade County" changed its name to "Miami-Dade County", and the new name resulted in a FIPS code change to 86.

Unfortunately systems that do not track identity through time will report erroneous data in these cases. For example, SAS software's Problem Note 31231 reports, "The SAS/GRAPH map data sets MAPS.COUNTY, MAPS.COUNTIES, and MAPS.USCOUNTY incorrectly use the county FIPS code value of 25 rather than the county FIPS code of 86 for Miami-Dade county, Florida." Furthermore, "the SAS/GRAPH map data set MAPS.CNTYNAME incorrectly uses the name 'Dade' and the FIPS value of 25 rather than the correct name 'Miami-Dade' and FIPS value of 86 for Miami-Dade county." The problem reports concludes that "this [error] can cause problems when trying to map response data that contains the correct FIPS code." However, the problem report understates the nature of the problem. If one makes the changes suggested in the problem report and if one subsequently runs some analysis on data older than Nov. 13, 1997, the analysis will be incorrect. In fact, there is no way for this system, as currently designed, to give correct results for data that spans Nov. 12, 1997. What at first might appear to be a mere annoyance can result in serious errors that can be difficult to detect despite their substantial impact in subsequent analysis.

Many other examples exist. North American Industry Classification System (NAICS) industry code 1211 ("Bituminous coal and lignite") was split into codes 1221 ("Bituminous coal and lignite—surface") and 1222 ("Bituminous coal—underground") in the 1987 NAICS industry code update. A time series that spans that transition and references those codes could be difficult to process correctly. As another simple example, the company formed as "AOL Time Warner" has at various stages acquired and spun off "AOL", "Time Warner", "Time Warner Cable", "AOL" (different), while also experiencing at least one renaming (to "Time Warner" from "AOL Time Warner"). Germany has had eight different currencies since 1873. The Kingdom of Montenegro became Montenegro via Yugoslavia. Apple, Inc. has sold a succession of different iPhones. Such examples exist in many domains.

Some systems provide what is essentially a synonym service using, for example, the Resource Description Framework ("RDF") property owl:sameAs. However, this property has no notion of time or context. "AOL Time Warner" should not be owl:sameAs "Time Warner" at any time. The Freebase system, which is a sophisticated system in many respects, does not even attempt to model the persistence of identity through time:

> Identity over time is a difficult subject to model on Freebase. If [a] building has over time been used as church and a dance club, Freebase will type it as a church and as a dance club. This gives rise to coherency issues. Right now Freebase doesn't have a (sic) infrastructure to easily model change. [http://wiki.freebase.com/wiki/Identity_over_time]

Part of the challenge is that modeling identity over time is sufficiently challenging on its own that an application not dedicated to that enterprise simply cannot afford an excursion into that territory.

SUMMARY OF THE INVENTION

Due to the Protean nature of many entities and even their names, processing historical data is problematic. Different names for the same entity as well as the same name for different entities complicate the task. Therefore a need has arisen for a system and method which models the persistence of identity through time. In addition, there is a need for propagating knowledge throughout entities' evolutionary histories.

In accordance with the present invention, a system and method are provided which substantially reduce the disadvantages and problems associated with previous methods and systems for processing data representing entities that change. Entities are related via perdurance relationships associated with events, and epistemological relationships are propagated during traversal of those perdurance relationships.

More specifically, an event processor accepts event representations that comprise perdurance and epistemological relationships among entities or entity references, and the event processor stores information derived from event representations in a datastore. A search component searches entities based on local epistemological and perdurance properties, and a perdurance engine traverses the perdurance relationships obtained from the datastore. An epistemological propagator generates derived epistemological relationships using the perdurance engine and local epistemological data obtained from the datastore. An intersection engine, if present, locates a set of entities that share a set of specified derived epistemological properties. Probability distributions represent uncertainties in relationships and values, including times, and propagated relationships may have associated probability distributions. A query service submits queries to the search component and then utilizes the intersection engine to obtain the requested entities, which are accumulated using the epistemological propagator. Additionally, a perdurance service 103 can expose perdurance information to remote agents.

The present invention provides a number of important technical advantages. One example of an important technical advantage is that a query can specify a time parameter to obtain entity relationships that held, with some probabilities, at the specified time or time interval. Additionally, if an entity is in a perdurance relationship with a second entity, the first epistemological relationships can propagate to the second entity. Using an intersection engine, the second entity's local, explicit epistemological relationships can be combined with the derived relationships in order to locate the second entity for a query which seeks a combination of relationships not all present locally. In this example, the second entity need not explicitly participate in one or more of the given relationships.

Another advantage of the present invention is historically accurate query results can be replicated using a conjunction of time constraints. For example, a query can obtain entities meeting given requirements with the provision that the requirements obtain on or after a specified effective date and a specified reported date. Using this ability, a query can serve as a reference to a set of entities without having to enumerate them, a task which can be impossible if some of those entities are not known at the time the query is constructed or first used.

The present invention also can provide a perdurance service for a variety of entities. Other systems can access this perdurance service to avoid the disadvantages of attempting to maintain some partial, ad hoc identity information locally. In such an example, perdurance information is typically routed to the perdurance service or associated component. Then agents can access the perdurance service. In this manner, agents enjoy the benefits of integrated, sophisticated identity information without the burden of acquiring and maintaining that data over time.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A perdurance system that propagates epistemological relationships enables historically accurate data analysis based on perdurance relationships. This perdurance system subsumes and significantly extends an owl:sameAs server.

A relationship typically comprises a set of pairs. A pair comprises a property and a value or set of values. Simple unary predicates can also be considered to be relations. Alternatively, a unary predicate is reified such that the additional property indicates the type of the subject. Additionally, a relationship can itself participate in relationships, such as those conveying context, author, or similar "metadata". Some embodiments, however, in-line these meta-relationships when there is no potential for ambiguity. For example, a context property, which typically can take multiple values, can usually be added to the base relationship.

Figure 1:
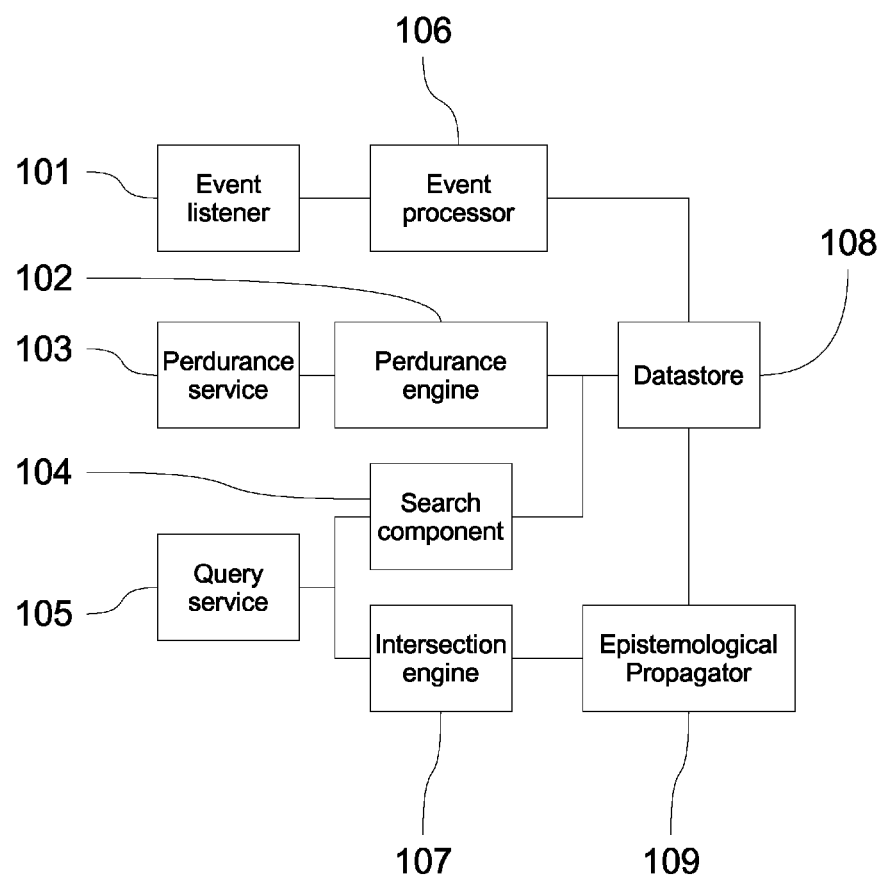
FIG. 1 depicts a block diagram of a perdurance system.

FIG. 1 depicts a block diagram of a perdurance system.

An event listener 101 accepts event content over a communications interface. For example, an event listener 101 could listen for event submission events on a network interface on a TCP network.

Event content comprises event representations that include perdurance and epistemological relationships among entities or entity references. Event content typically also includes, or is associated with, other event information such as sources, certain times, contexts, event types, and authentication information. More generally, events themselves can have properties and participate in relationships.

Entities can be of any type. An advantage of the present invention is that it offers a general mechanism for modeling perdurance for entities of arbitrary type. Taxonomic classifications, monetary currencies, geographical designations, corporations, roads, National Football League teams, and products are all appropriate classes of entity. For example, today's U.S. Route 81 Highway roughly follows what was called the Meridian Highway in the early twentieth century. The NFL's Houston Oilers professional football team became the Tennessee Titans in 1998. Broomfield County, Colo., was been created from parts of Adams (001), Boulder (013), Jefferson (059), and Weld (123) counties effective Nov. 15, 2001. The iPhone 3GS eventually replaced the iPhone 3 in Apple's product line. Of course, many other examples exist. The invention provides a general mechanism for modeling persistence of identity and associated analysis.

Perdurance relationships among entities typically describe how those entities are created, destroyed, and transformed. For example, an event could absorb one entity and emit two new entities. A typical lexicon for perdurance relations differentiates among input, output, and perhaps modified entities. For example, a lexicon could include relations for entity fusion, fission, succession (or replacement), and similar concepts. Additionally, mereological relations may be considered to be perdurance relations.

"Epistemological" relationships include those other than perdurance relationships. This characterization is not intended to distinguish from those formed using, say, ontological relations. Instead, the term "epistemological" simply emphasizes some sense of practicality or application.

An important class of epistemological relationship describes names of things. Note that naming in this sense is—or can be—independent of perdurance or related notions of identity. Different things can have the same names even in the same or similar contexts. One thing might have different names at the same or at different times. The ability to treat names and identity separately is an important capability of many embodiments.

Epistemological relations can sometimes include intrinsic and extrinsic properties. As described below, an intrinsic property might propagate further than an extrinsic one.

Event representation can be extended to convey additional entity relationships such as refinement, coreference, and coincidence. In particular, an entity could be described as being owl:sameAs another entity. Other example relations include deprecation and obsolescence. Additionally, mereological relations are in some cases appropriate here.

A typical event has one or more time properties to describe when the event was accepted by the system, when the event became effective, when a dissemination embargo related to the event is lifted, and when the event was reported by some reporting agency. Ideally the time unit reflects actual knowledge. For example, an announcement promulgated by a government organization might use the time unit of "Day, Eastern Standard Time" or "GMT Day" or some similar unit. Some embodiments support uncertainty with respect to these times. Such an embodiment might accept a distribution of probabilities over time (with an associated unit). Unlike some other systems, the present invention does not demand an elaborate time ontology; however, time ontologies are compatible with and in some cases can be used within the invention.

Some embodiments consider an event as itself an entity. In this manner, an embodiment can report the evolution of events themselves as they are created, edited, and deleted. For example, the simple statement that "Event X succeed event Y" could be a statement about versions of representations of an event.

Typical embodiments accept event metadata such as author, primary or other sources, context, release, URI, and reviewers. Since some embodiments can treat events as entities, these "metadata" can be treated as epistemological relationships. Event or relationship context can be particularly important. Using a classic example, in some contexts, the "Morning Star" is the same as the "Evening Star" and both are the same as "Venus". In other context, those terms are not synonyms.

An event processor 106 then receives event content and associated information from the event listener, and the event processor stores the data in a datastore 108. In typical embodiments, the event processor 106 validates, logs, and authorizes event submissions. Additionally, a typical event processor 106 stores any provided source objects, such as PDF files, in a source repository. Those source objects are typically associated with the events or other information that they support. Pointers from data to supporting sources as well as from sources to the supported data allow for efficient, bidirectional linking to and from sources.

A source repository, if provided, can archive primary or other sources supporting the data in the system. For example, some epistemological data might have originated in a section of a page on a Web site. Since that source will likely not survive in its present form at its present location, the page could be converted to a PDF document, which can then be stored in the source repository. The epistemological data that the document supports can, for example, be annotated with a reference to that document, and the document can be annotated with with URL (and section) for the original supporting material. Source references, source origin references, and a source repository provide independent historical support for some of the information in the datastore. Additionally, sources themselves may be treated as entities. Using that technique or alternate techniques, sources can carry information such as the organization that promulgated the source, the authors of the source, the time at which the source was observed, and other properties.

Some embodiments can treat a source as an entity. In this manner, sources can have, say, successors, and sources can be organized into groups, subgroups, related groups, and in other manners. Such source organization can also be supported without treating sources as entities.

A search component 104 searches entities based on "local" epistemological properties. A "local" epistemological property is explicitly associated with an entity rather than being derived. For example, the search component 104 can locate all entities having a specified name and owner. A search service, if present, exposes the search component functionality to agents. For example, a search service can listen on a network interface for search requests, and the service can forward responses received from the search component.

A perdurance engine 102 traverses the perdurance relationships. In a simple case, given an entity, the perdurance engine 102 can recursively produce entities in perdurance relationships with the given entity. Perdurance relationships form a logical graph, which can contain cycles; therefore, typical perdurance engines 102 contain cycle detectors to avoid infinite execution paths. In more complex cases, a perdurance engine 102 might, given an initial set of entities, a traversal predicate, and an accumulator, return the populated accumulator based on traversal of the given entities across events that satisfy the traversal predicate.

A perdurance service 103 can expose perdurance information, including traversals by a perdurance engine 102, to remote agents. For example, a perdurance service 103 could, given an origin entity, return a perdurance graph with entity nodes restricted to those satisfying some constraints, such as effective date, author, and/or source. When combined with additional data, such as entity names, a perdurance service 103 itself is a significant advance of prior systems.

An epistemological propagator 109 generates derived epistemological relationships using the perdurance engine 102 and local epistemological data. In a simple example, if (1) P is an intrinsic property, (2) some event E establishes entity B as the successor (in some sense in some lexicon) of entity A, and (3) P(A) obtains, then an epistemological propagator 109 can conclude that P(B) obtains. The perdurance engine 102 can provide (2), and local epistemological data reports P(A).

Since the propagation of epistemological data through perdurance can be uncertain, typical epistemological propagators 109 support probabilistic propagation in the form of probability distributions associated with derived epistemological relationships. The manner of such propagation can vary considerably. For example, a propagator might obtain or assess different propagation potentials with different perdurance relations. Events themselves have have associated probability data that can influence propagation. Alternately or in addition, a propagator might obtain or assess propagation probabilities based on local epistemological data—either that which is itself being propagating or other local epistemological data that influences the propagation.

Events typical have time properties, and epistemological propagation requests typical have their own time properties; therefore, typical epistemological propagators 109 consider both sets of time properties when determining derived epistemological relationships. For example, a propagation request might include a parameter that requests that propagation be relative to some effective date in the past. Events after that date would, assuming certain configuration, not be considered. As another example, the probability of P(A) might be lower as of today than as of last year—in certain circumstances.

The logical graph of perdurance relationships can potentially give multiple paths between two entities (in a connected component), sophisticated epistemological propagators 109 aggregate many or all such perdurance paths. In addition, some embodiments might account for multiple paths separately as analogous to a notion of support.

The epistemological propagator 109 typically can encounter conflicting information. As a simple example, the propagator might encounter two name properties for the same entity. In this case, multiple names, or references, might be acceptable or even desired in order to provide, say, a synonym service. In other cases, multiple values, such as for an intrinsic property such as mass, are troublesome. In these cases, an epistemological propagator 109 typically proceeds using probability distributions to capture the uncertainty.

Given a perdurance relationship between two entities, epistemological relationships involving one of the entities, and other information, such as properties associated with the event specifying the perdurance relationships, the epistemological propagator 109 seeks to derive relationships and related data for the other entity. In particular, a typical epistemological propagator 109 will seek to derive one or more probability distributions for the derived relationships. Any local relationships for the second entity upon which propagated relationships supervene may be considered as priors and updated accordingly. In typical embodiments, the derivation of the derived probability distributions is governed by propagation mechanics, which determine probabilities based on given information enumerated above as well as related information. As a simple example, an intrinsic property could propagate through a "successor" perdurance relation with 95% probability. In contrast, an extrinsic property might propagate through an "fragment" relation, at a time distance of two years with no source from a government agency, with probability of 12%. These rules are called "propagation fields". Typical embodiments support a declarative representation of the desired propagation mechanics. However, such an ability introduces a complexity challenge due to the high dimensionality of the relevant information. Therefore, some embodiments support a non-orthogonal, non-disjoint representation of propagation mechanics by allowing combinations of propagation fields. In particular, multiple fields can be combined into a single field. For example, the previous example propagation field could be presented as two fields: (1) "an extrinsic property propagates through an "fragment" relation, at a time distance of two years, with probability of 24%" and (2) "a property propagates through a relation with no government source with a probability of 50%". The specification of propagation mechanics can be very complex, and several mechanisms, such as prioritization, contextual constraints, and probability thresholds are supported by some embodiments. For example, as an optimization, a propagation mechanics specification might allow for a field to be treated a zero or one (probability) if its probability is sufficiently low or high respectively. In these cases, an embodiment might note the optimizations in effect in a citation graph.

Developing the desired propagation mechanisms can require a substantial effort. Therefore, the present invention provides a facility to reduce the required work. Given a datastore 108 of perdurance and epistemological information, a propagation mechanics learning engine can apply supervised learning techniques to construct propagation mechanics. The process uses the known, local perdurance and epistemological information to construct a propagation model that fits this information. For example, an embodiment could use support vector machines, naïve Bayes systems, nearest neighbor computations, or regressions to build these models. Many variations of these techniques as well as other techniques may be suitable. One benefit is the a potentially complex propagation mechanics can be learned from real data. In some cases, that mechanics can be applied without alteration. In other cases, a user can modify the mechanics before use.

As the epistemological propagator 109 proceeds, derived epistemological relationships can accumulate based on multiple traversal paths. In these cases and some similar cases, the manner that a derived relationship was derived might not be immediately apparent. Therefore, some epistemological propagators 109 annotate derivations with citation graphs. These structures represent some or all of the derivation history for the derived relationship, and they typically take the form of a chain or tree. In particular, a citation graph could comprise exemplary perdurance paths and other information relating to the derivation. Additionally, a citation graph can comprise source references; alternately, a citation graph can contain information sufficient to obtain any supporting source references. Since an agent might wish to understand or verify a derived relationship, various services typically provide citation graphs for those relationships.

An intersection engine 107, if present, generates a set of entities that share a (non-singleton) set of specified derived epistemological properties. As an example, an agent (directed by a user or another system) specifies the desired set of epistemological properties. The search component 104 locates entities with the specified properties locally. Then those entities are routed to propagation queues, and epistemological propagators 109 pick them up for propagation of the specified epistemological properties. In this manner, propagations can occur concurrently. If an encountered entity is present in its origin propagation queue, it is removed from that queue. For each specified epistemological property, the intersection engine 107 routes entities from the epistemological propagator 109 tasks to property-specific intersection pipelines, which store their entities in some manner, such as order, that facilitates the computation of the intersection of the pipelines (in the manner in this example of a merge join). Other intersection strategies are of course possible. For example, an intersection engine 107 could elect to select one property for epistemological propagation and use the remaining properties as a filter on the output. As another example, under the direction of an intersection engine, a propagation task could halt if the derived probability distribution (if any) has a specified feature or characteristic.

A query service 105 submits queries to the search component 104 and then utilizes the intersection engine 107 to obtain the requested entities, which are accumulated using the epistemological propagator 109.

Figure 2:
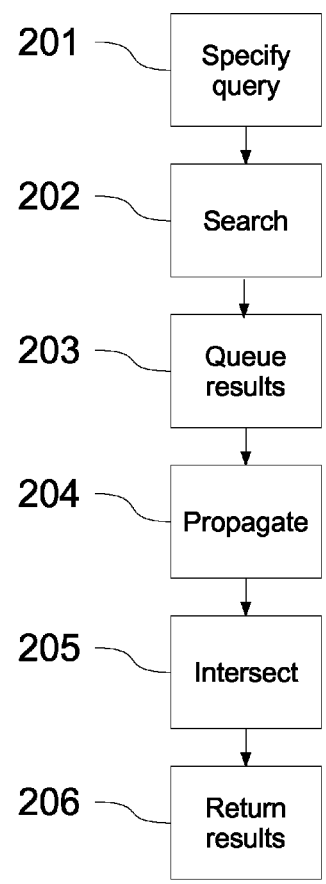
FIG. 2 depicts a flow diagram of a process querying a perdurance system.

FIG. 2 depicts a flow diagram of an example process for querying a perdurance system At step 201, a user or agent specifies a query for entities. The query contains one or more properties that the found entities should have. Typically the query includes constraints, either implicit or explicit, relating to time. For example, a query could seek entities that satisfy some conditions as of a specified effective date.

At step 202, a search is executed for each specified property. These searches can occur concurrently. At step 203, search results are enqueued in property-specific queues as the results arrive. The property-specific queues are dequeued concurrently to initiate epistemological propagation at step 204 of the entities' respective properties starting with those entities. For example, a query for entities which (1) have a name that contains "Dade" and (2) are in the state of Florida, will trigger two searches (one relating to "Dade" and one relating to "Florida"), and the results of each search will in turn trigger a sequence of propagations, at step 204, for the triggering properties based on each search result.

Step 205 computes the intersection of the property-specific containers as entities encountered during the propagations are stored in property-specific containers. For example, entities that have derived names that contain "Dade" could be inserted into a sorted list of such entities. As those entries are stored, step 205 can merge the lists to identify entities common to all lists. Step 206 returns those common entities to the user or agent. Typical embodiments execute these steps concurrently as entities are located incrementally.

Although the present invention has been described in detail, it should be understood that various changes, substitutions and alterations can be made hereto without departing from the spirit and scope of the invention as defined by the appended claims.

What is claimed is:
1. A system for propagating knowledge through perdurance, the system comprising:
   a computer memory for storing executable instructions;
   an event processor represented by the executable instructions that process perdurance and epistemological rela- tionships of first entities that form a logical graph that admits multiple paths between two of the first entities and admits cycles;
a search component, which locates second entities having common perdurance or local epistemological properties;
a property queue, which receives the second entities located by the search component;
a perdurance engine, which comprises a cycle detector operable to avoid infinite execution paths and which returns a populated accumulator based on the traversal of given entities across events that satisfy a given traversal predicate;
an epistemological propagator, which propagates intrinsic and extrinsic properties according to different first propagation fields, generates derived epistemological relationships and probability distributions for the derived relationships using the perdurance engine according to a combination of second propagation fields, and which annotates derivations of relationships with citation graphs that comprise perdurance paths relating to the derivations;
property pipelines, which receives the derived epistemological relationships; and
an intersection engine, which identifies third entities that have common derived epistemological properties in the property pipelines;
wherein the system:
dequeues an entity concurrently to initiate epistemological propagation;
recursively produces fourth entities in perdurance relationships with an entity;
derives third propagation fields based on the derived probability determined by propagation mechanics specified in a declarative representation;
locates fifth entities that share a set of specified derived epistemological properties;
obtains different first propagation potentials for an event with different perdurance relations and propagation probabilities based on local epistemological data being propagated or other local epistemological data that influences the propagation;
propagates the entity's specified common perdurance or local epistemological properties to a second entity;
combines the second entity's epistemological relationships with the derived relationships to locate sixth entities for a query which seeks a combination of relationships not present;
routes the sixth entities from the propagating to property-specific intersection pipelines;
computes the intersection of the pipelines to obtain seventh entities, which are accumulated using the epistemological propagator and which are stored in property-specific containers; and
uses the query to serve as a reference by replicating the query results using a conjunction of time constraints and obtaining eighth entities meeting given requirements with the provision that the requirements obtain on or after a specified effective date and a specified reported date.

2. The system of claim 1 wherein the perdurance relationships represent perdurance events that include entity emission, absorption, fission, fusion, creation, or destruction.

3. The system of claim 2 wherein the perdurance relationships comprise time properties representing write time, report time, embargo time, or effective time.

4. The system of claim 3 wherein probability distributions associated with a derived epistemological relationship are based on specified times and perdurance relationships.

5. The system of claim 4 wherein probability distributions associated with derived epistemological relationships are based on aggregations of multiple perdurance paths.

6. The system of claim 5 further comprising a propagation mechanics learning engine operable to generate the propagation mechanics from local perdurance and epistemological data.

7. The system of claim 6 wherein the intersection engine identifies entities that have epistemological properties with a characteristic probability distribution.

8. The system of claim 7 wherein the events act as entities and event metadata is treated as epistemological relationships.

* * * * *